(12) United States Patent
Dautreppe et al.

(10) Patent No.: US 12,215,631 B2
(45) Date of Patent: Feb. 4, 2025

(54) TURBOMACHINE MODULE EQUIPPED WITH AN ELECTRIC MACHINE, AND TURBOMACHINE EQUIPPED WITH SUCH A MODULE

(71) Applicant: SAFRAN AIRCRAFT ENGINES, Paris (FR)

(72) Inventors: Frédéric Dautreppe, Moissy-Cramayel (FR); Jean-Pierre Elie Galivel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/259,226

(22) PCT Filed: Dec. 20, 2021

(86) PCT No.: PCT/FR2021/052401
§ 371 (c)(1),
(2) Date: Jun. 23, 2023

(87) PCT Pub. No.: WO2022/144514
PCT Pub. Date: Jul. 7, 2022

(65) Prior Publication Data
US 2024/0052789 A1 Feb. 15, 2024

(30) Foreign Application Priority Data

Dec. 28, 2020 (FR) ...................................... 2014169

(51) Int. Cl.
*F02C 7/36* (2006.01)
*F02C 7/06* (2006.01)
(Continued)

(52) U.S. Cl.
CPC .................. *F02C 7/36* (2013.01); *F02C 7/06* (2013.01); *F02C 7/275* (2013.01); *F02C 7/32* (2013.01);
(Continued)

(58) Field of Classification Search
CPC ...... F02C 7/36; F02C 7/06; F02C 7/27; F02C 7/275; F05D 2220/323; F05D 2260/40311
See application file for complete search history.

(56) References Cited

U.S. PATENT DOCUMENTS 7,841,163 B2 * 11/2010 Welch ....................... F02C 7/32
60/262
8,013,488 B2 * 9/2011 Berenger .................. F02C 7/32
310/120
(Continued)

FOREIGN PATENT DOCUMENTS

EP 2 530 282 A1 12/2012

OTHER PUBLICATIONS

International Search Report mailed Apr. 28, 2022, issued in corresponding International Application No. PCT/FR2021/052401, filed Dec. 20, 2021, 6 pages.
(Continued)

*Primary Examiner* — Woody A Lee, Jr.
*Assistant Examiner* — Joshua R Beebe
(74) *Attorney, Agent, or Firm* — CHRISTENSEN O'CONNOR JOHNSON KINDNESS PLLC

(57) ABSTRACT

An aircraft turbomachine module, including an accessory gearbox, a transfer shaft, and a drive shaft rotatably connected with one another by a power transmission device. The power transmission device can be housed in a gearbox and the module can further include an electric machine rotatably connected to the transfer shaft. The electric
(Continued)

machine can be interposed between the transmission housing and at least one part the transfer shaft.

12 Claims, 2 Drawing Sheets

(51) Int. Cl.
    *F02C 7/275*     (2006.01)
    *F02C 7/32*     (2006.01)

(52) U.S. Cl.
    CPC .................. *F05D 2220/323* (2013.01); *F05D 2260/40311* (2013.01)

(56) References Cited

U.S. PATENT DOCUMENTS

| | | | |
|---|---|---|---|
| 9,548,639 B2* | 1/2017 | Goi | H02K 7/1823 |
| 2008/0053257 A1* | 3/2008 | Dusserre-Telmon | F02C 7/32 |
| | | | 74/650 |
| 2008/0072568 A1* | 3/2008 | Moniz | F01D 25/34 |
| | | | 60/226.1 |
| 2008/0238098 A1* | 10/2008 | Becquerelle | H02K 11/042 |
| | | | 290/8 |
| 2013/0057093 A1* | 3/2013 | Beier | F01D 25/243 |
| | | | 310/52 |
| 2013/0098179 A1* | 4/2013 | Beier | F16H 35/00 |
| | | | 74/15.63 |
| 2018/0283281 A1 | 10/2018 | Veilleuz, Jr. et al. | |
| 2019/0146526 A1 | 5/2019 | Hochstetler et al. | |

OTHER PUBLICATIONS

Written Opinion mailed Apr. 28, 2022, issued in corresponding International Application No. PCT/FR2021/052401, filed Dec. 20, 2021, 5 pages.

* cited by examiner

TURBOMACHINE MODULE EQUIPPED WITH AN ELECTRIC MACHINE, AND TURBOMACHINE EQUIPPED WITH SUCH A MODULE

CROSS-REFERENCE TO RELATED APPLICATIONS

This application is a National Stage of International Application No. PCT/FR2021/052401, filed Dec. 20, 2021, which claims priority to French Patent Application No. 2014169, filed Dec. 28, 2020, the entire disclosures of which are hereby incorporated by reference in their entirety for all purposes.

FIELD OF THE INVENTION

This invention relates to the field of the turbomachines for aircrafts, and in particular to turbomachine modules equipped with an electric machine. It is aimed in particular at the turbomachines equipped with such a module and an accessory gearbox linked to the electric machine.

TECHNICAL BACKGROUND

An aircraft turbomachine, such as a double-flow turbomachine, generally comprises a ducted fan arranged at the inlet of the turbomachine and which is driven in rotation by a low-pressure shaft. In certain configurations of turbomachines with ultra high bypass ratios, referred to as UHBR, a reducer can be interposed between the fan and the low-pressure shaft so that the fan rotates at a lower speed than the low-pressure shaft. The reduction of the speed also allows to increase the size of the fan, enabling very high bypass ratio to be achieved.

The turbomachine comprises an accessory gearbox (AGB) to supply various items of equipment or accessories needed to operate the turbomachine or the aircraft. An example of an accessory is a permanent magnet alternator (PMA), which ensures to generation of electrical current, typically using the accessory gearbox. In particular, the alternator is designed to supply an electrical power to the turbomachine computer such as the FADEC (Full Authority Digital Engine Control) from an idle speed. Examples of turbomachines equipped with accessory gearbox are described in the patent documents US-A1-2013/098179, US-A1-2018/283281 and US-A1-2019/146526.

The accessory gearbox consists of a series of shaft lines (gear trains) driving the items of equipment at different speed ratios. The accessory gearbox is typically driven by means of a radial shaft on the rotor of the high-pressure compressor. The latter is coupled to a transfer shaft in the accessory gearbox by a transfer gearbox referred by the acronym TGB.

It is known to equip the accessory gearbox with an electric machine which is an electromechanical device based on the electromagnetism allowing the conversion of electrical energy for example into mechanical energy (generator mode) or in a reversible way, allowing the production of the electricity from a mechanical energy (motor mode). The electric machine can behave in both generator and motor mode.

This electric machine can be used to drive the high-pressure shaft for a limited time and ideally at very low speed when the turbomachine is stopped and the aircraft is on the ground. The rotation of the high-pressure shaft can be carried out by the magnet alternator as described in the patent application FR2950658. The rotation of the high-pressure shaft when the turbomachine is at a standstill allows to prevent the high-pressure body from buttressing due to the thermal gradient between the top and the bottom of the high-pressure rotor. This thermal gradient is caused by the convection of the air circulating in the turbomachine. A restarting of the engine with this thermal gradient present on the rotor could lead to an increase in vibrations, with the risk of friction for the blades of the rotor of the turbine or of the low-pressure compressor on their respective casings. This phenomenon leads to a deterioration in performance and potentially in the turbomachine. In addition, the peak deflection of the rotor can be reached up to 2 hours after the turbomachine has stopped. The buttressing of the high-pressure body is critical for all the aircrafts that perform several flights in a single day.

SUMMARY OF THE INVENTION

In particular, the aim of the present invention is to provide a solution allowing one or more items of equipment to be integrated into a restricted environment of the turbomachine in order to easily drive one of its motor shafts while avoiding penalising the mass of the turbomachine and the manufacturing cost.

This objective is achieved, in accordance with the invention, by means of a turbomachine module for an aircraft, comprising an accessory gearbox and a transfer shaft and a drive shaft connected in rotation with one another by means of a power transmission device, the power transmission device being housed in a transmission housing, the module further comprising an electric machine connected in rotation to the transfer shaft, the electric machine being interposed between the transmission housing and at least one portion of the transfer shaft.

Thus, this solution allows to achieve the above-mentioned objective. In particular, such a configuration allows to avoid bulk and takes advantage of the space available between the first power transmission device and the accessory gearbox (generally comprising a gear). The electric machine allows the mechanical power to be collected from or injected into the motor shaft, in particular when the aircraft is on the ground, without significantly modifying this architecture.

The turbomachine module also comprises one or more of the following characteristics, taken alone or in combination:
- the electric machine comprises a rotor which is secured in rotation to the transfer shaft and a stator which surrounds the rotor and which is fixedly mounted with respect to the transmission housing.
- the stator is carried by a radially internal surface of a cylindrical wall attached to the transmission housing.
- the transfer shaft is enveloped by a first casing, the electric machine being housed in a second casing mounted between the transmission housing and the first casing, and said cylindrical wall forms a wall of the second casing.
- the power transmission device comprises an output shaft coupled to the transfer shaft and around which the rotor is mounted radially.
- the output shaft comprises a first segment arranged in an annular wall of the transmission housing and a second segment which extends outside the annular wall, the second segment having a diameter smaller than that of the first segment so as to form a shoulder at the junction of the first and second segments.

the module comprises a bushing mounted on the second segment of the output shaft and positioned in abutment against the shoulder, the rotor being mounted on the bushing.

the module comprises at least one tightening means for tightening the bushing against the shoulder of the output shaft.

the second segment of the output shaft comprises a hollow portion which extends axially over all or part of the second segment and which receives an end of the transfer shaft, coupling means being provided between said end and said hollow portion so that the output shaft and the transfer shaft are secured in rotation.

the output shaft is guided in rotation in the annular wall by means of at least one rotational guide bearing, a sealing element being arranged at the level of an opening in the annular wall and around the first segment of the output shaft.

the electric machine is of the motor and/or generator type.

the output shaft comprises first splines intended to cooperate with second splines on the transfer shaft.

the first splines are arranged on a radially internal surface at the level of a first end.

the second casing is attached to the transmission housing and the first casing, which are stationary.

the electric machine is a permanent magnet alternator.

the toothed pinions and the wheels are conical.

the electric machine is arranged, in particular axially, between the first power transmission device and the accessory gearbox.

the transfer shaft extends out of the accessory gearbox.

The invention also relates to an aircraft turbomachine comprising a high pressure motor shaft and a turbomachine module having any of the above characteristics, wherein the power transmission device is a first power transmission device and the drive shaft is connected to the high pressure motor shaft by means of a second power transmission device, such that the transfer shaft and the high pressure motor shaft are connected in rotation.

The turbomachine also comprises one or more of the following characteristics, taken alone or in combination:

the second power transmission device comprises an input wheel which is mounted on the high pressure motor shaft and which meshes with a second toothed pinion mounted at a second end of the drive shaft.

the drive shaft extends inside a casing arm.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the following attached figures.

DETAILED DESCRIPTION OF THE INVENTION

Figures 1, 2:
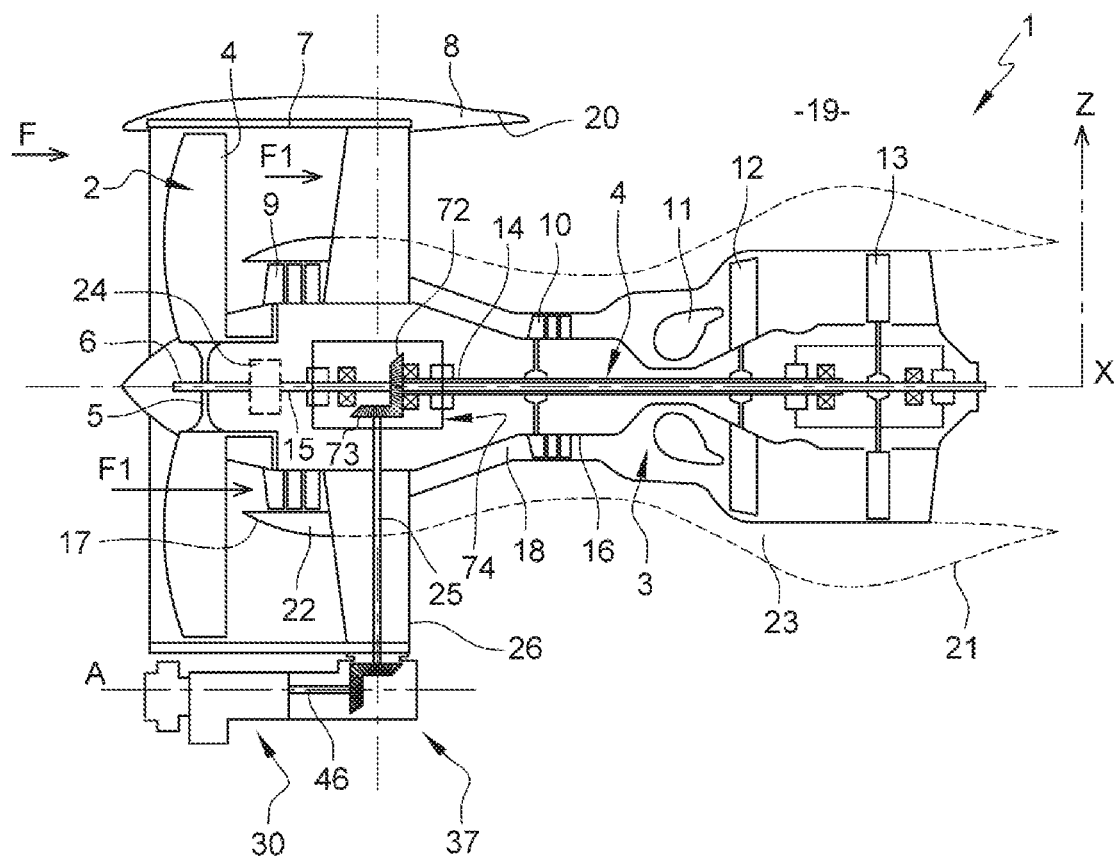
FIG. 1 is a schematic axial cross-sectional view of a double-flow turbomachine according to the invention.
FIG. 2 is a schematic view of a turbomachine module with an electric machine installed between a first mechanical transmission device and an accessory gearbox according to the invention.

FIG. 1 shows an axial cross-sectional view of a turbomachine 1 of longitudinal axis X to which the invention applies.

The turbomachine shown is a dual-flow, two-spool turbomachine intended to be mounted on an aircraft. Of course, the invention is not limited to this type of turbomachine.

In the present application, the terms "upstream", "downstream", "axial" and "axially" are defined with respect to the orientation of circulation of the gases in the turbomachine and also along the longitudinal axis (and even from left to right in FIG. 1). The terms "radial," "radially", "internal", and "external" are also defined with respect to a radial axis Z that is perpendicular to the axis X of the turbomachine.

This double-flow and two-spool turbomachine 1 comprises a fan 2 that is mounted upstream of a gas generator or of a gas turbine engine 3. The fan 2 comprises a plurality of fan vanes 4 that extend radially from the periphery of a disc 5 through which a fan shaft 6 passes. The fan 2 is surrounded by a fan casing 7 centred on the longitudinal axis X. The fan casing 7 is carried by a nacelle 8 which extends around the gas generator 3 and along the longitudinal axis X.

The gas generator 3 comprises, from upstream to downstream, a low-pressure (LP) compressor 9, a high-pressure (HP) compressor 10, a combustion chamber 11, a high-pressure turbine 12 and a low-pressure turbine 13. The rotor of the HP compressor 10 is connected to the rotor of the HP turbine via an HP shaft 14 centred on the longitudinal axis to form a first spool referred to as high-pressure. The rotor of the LP compressor is connected to the rotor of the LP turbine via a LP shaft 15 centred on the longitudinal axis to form a second spool referred to as low-pressure body. The LP shaft 15 extends inside the HP shaft 14. The HP shaft 14 is a motor shaft, which is driven in rotation along the longitudinal axis X in an internal casing 16 centred on the longitudinal axis.

An air flow F that enters the turbomachine via the fan 2 is divided by a splitter nose 17 of the turbomachine into a primary air flow F1 that passes through the gas generator 3 and in particular in a primary duct 18, and into a secondary air flow F2 that circulates around the gas generator 3 in a secondary duct 19. The primary duct 18 and the secondary duct 19 are coaxial. The secondary air flow F2 is ejected by a secondary nozzle 20 terminating the nacelle 8, while the primary air flow F1 is ejected outside the turbomachine via an ejection nozzle 21 located downstream of the gas generator. The primary duct 18 is delimited at least partly radially by the internal casing 16 and an inlet casing 22. The secondary duct 19 is delimited at least partly radially by the inlet casing 22 and the fan casing. The inlet casing 22 carries the splitter nose 17 upstream and is extended downstream by an inter-duct casing 23 which carries the ejection nozzle 21.

In an optional configuration, a speed reducer 24 can connect the LP shaft 15 to the fan shaft 6, to allow the speed of the fan 2 to be reduced to a lower speed than that of the LP shaft 15. The speed reducer 24 also allows a fan with a large diameter to be arranged so as to increase the bypass ratio. The bypass ratio of the fan is advantageously higher than 10. Preferably, the bypass ratio is between 15 and 20. The speed reducer can be either of planetary train or epicyclic train.

The turbomachine comprises a drive shaft 25 which is connected, on the one hand, to the high-pressure shaft 14 and, on the other hand, to an accessory gearbox 30 of the turbomachine. The drive shaft extends more or less radially, at an angle of between 0° and 30° relative to the radial axis Z, i.e. between 60° and 90° relative to the longitudinal axis X. This drive shaft allows the motor shaft, in this case the HP shaft 14, to be driven in rotation so that the turbomachine can be started via an item of equipment or accessory cooperating with an accessory gearbox described below.

In this example, the drive shaft 25 is referred to as a radial shaft because it extends substantially radially, being housed in a structural element of the turbomachine. This structural element extends substantially radially between the internal casing 16 and the fan casing and/or the nacelle 8. The structural element is a casing arm 26 which structurally connects the internal casing 16 to the fan casing.

With reference to FIG. 2, the accessory gearbox 30 is arranged in a compartment of the nacelle 8, and receives the various items of equipment or accessories of the turbomachine. This items of equipment, mounted on the gearbox 30, may be fuel pumps, electric generators, a lubrication unit, a starter motor, etc. Generally, the gearbox 30 comprises a gear train 31 consisting of a number of toothed wheels 32 that mesh with one another, some of which are coupled to the rotating portions of the items of equipment to drive them in rotation. The gear train 31 is housed in a rigid envelope 33 intended to protect the toothed wheels 32.

The gearbox 30 comprises, among the toothed wheels 32, a toothed wheel forming an input to the gear train 31 and which is coupled to a first end 35 of a transfer shaft 34. The latter extends generally out of the gearbox 30, along an axis A which forms an angle with the axis of the drive shaft 25. It is understood that the transfer shaft 34 is coupled to the accessory gearbox 30. The transfer shaft 34 can be arranged, for example, so that its axis of rotation A is substantially parallel to the longitudinal axis X. The transfer shaft 34 comprises a second end 45 which is connected to the radial shaft 25 by means of a first power transmission device 37, also referred to as a bevel gear or else a transfer gearbox.

As shown in FIG. 2, the transfer shaft 34 is housed inside a first annular casing 38 centred on the axis A. This casing 38 may consist of a sheath which has no structural role but simply a protective function with respect to the transfer shaft 34. The first casing 38 comprises a first end 39 which is attached to a lateral wall 40 of the accessory gearbox 30 using attachment means. The attachment means can be bolts and/or screws. The transfer shaft 34 is hollow and extends along the axis A from this lateral wall 40 of the accessory gearbox 30.

The first power transmission device 37 comprises an output shaft 41 which is coupled to the transfer shaft 34. The output shaft 41 is coaxial with the transfer shaft 34. The output shaft 41 is also hollow over at least one portion of its axial length. Coupling means are arranged between the output shaft 41 and the transfer shaft 34 so that they secured in rotation. The output shaft comprises a first segment 51 and a second segment 64. The second segment 64 of the output shaft comprises a hollow portion 64a which extends axially over all or part of the second segment 64 from a first end 42 of the output shaft 41. The hollow portion 64a receives the second end 45 of the transfer shaft 34 and the coupling means are provided between the second end 45 and said hollow portion. In particular, the output shaft 41 comprises towards the first end 42 first splines 43 (shown in dashed lines) which are formed on a radially internal surface of the output shaft 41. These first splines 43 engage with corresponding second splines 44 on the transfer shaft 34. These second splines 44 are formed on a radially external surface of the transfer shaft 34 and at the level of the second end 45 thereof. In other words, the second end 45 of the transfer shaft 34 is mounted inside the output shaft 41. In this way, the output shaft 41 and the transfer shaft 34 are secured in rotation. Direct coupling of the output shaft 41 to the transfer shaft 34 allows to reduce the number of parts and the weight, simplifies the mounting and reduces the overall dimensions. The manufacturing and mounting costs are also reduced.

The output shaft 41 also comprises a second end 46 which carries a toothed wheel 47 with conical toothing. The latter meshes with a first pinion 48 with conical toothing carried by a radially external end 49 of the radial shaft 25, forming a transfer gearbox. The transfer gearbox allows to transmit a rotational movement between two shafts that are not parallel.

The first power transmission device 37 is housed in a transmission housing 50 which envelopes and protects the gears (formed by pinions and/or wheels).

The first segment 51 of the output shaft 41 rotates inside the transmission housing 50. To achieve this, rotational guide bearings 52 are arranged around this first segment 51. Advantageously, the guide bearings are rolling bearings. These each comprise an internal ring mounted on the first segment of the output shaft 41 and an external ring secured to an annular wall 53 of the transmission housing 50. Rolling members are arranged between the internal and external rings. The rolling members can be balls or rollers. The annular wall 53 is centred on the axis A. The first segment 51 of the output shaft is arranged in the annular wall of the transmission housing 50, while the second segment 64 extends outside the annular wall 53. The second segment 64 of the output shaft 41 has a diameter which is smaller than the diameter of the first segment 51. This difference in diameter is marked by a shoulder 65 which delimits the junction of the first and second segments 51, 64 of the output shaft 41.

FIG. 2 also illustrates an electric machine 54 which is intended to collect or inject a power (mechanical or electrical) from or onto the motor shaft respectively. The motor shaft can be either the low-pressure shaft or the high-pressure shaft of the two-spool turbomachine. In this example, the electric machine 54 is arranged between the first power transmission device 37 and the accessory gearbox 30. More precisely still, the electric machine 54 is interposed between the transmission housing 50 and at least one portion 34a of the transfer shaft 34.

In particular, the electric machine 54 comprises a rotor 54a and a stator 54b. Advantageously, but without limitation, the electric machine 54 operates in generator mode so as to convert the mechanical energy into electrical energy. In this example, the electric machine 30 is reversible, i.e. it can operate alternately in generator mode and motor mode. In motor mode, it converts the electrical energy into mechanical energy in order to drive the HP shaft or at least to assist its rotation.

The electric machine 54 is housed in a second annular casing 55. This second casing 55 is mounted between the transmission housing 50 of the first power transmission device and the first casing 38 of the transfer shaft 34. To this end, the second casing 55 comprises a cylindrical wall 56 with axis A. At a first end, the cylindrical wall 56 comprises a collar 57 which extends at least partly radially outwards with respect to the axis A. At a second end, the cylindrical wall 56 comprises an annular base 58 which is centred on the axis A. The annular base 58 is defined in a plane perpendicular to the axis A. The collar 57 is attached to an annular flange 59 of the transmission housing 50. The annular flange 59 is centred on the axis A and extends radially outwards from a distal end of the annular wall 53 of the transmission housing. Attachment means such as screws or bolts allow to carry out to attachment of the second casing to the transmission housing. The annular wall 53 comprises an opening through which the output shaft 41 extends outside the transmission housing 50. The opening is delimited by the annular flange 59. In particular, the second segment 64 of the output shaft 41 extends inside the cylindrical wall 59.

A cylindrical skirt 60 extends substantially along the axis A from an external surface 61 of the annular base 58. The cylindrical skirt 60 extends in particular inside the first casing 38. Sealing means, for example in the form of an O-ring, may be provided in a space provided radially between the cylindrical skirt 60 and the second end 62 (axially opposite the first end 39) of the first casing 38. In this way and during operation, the ambient air cannot get inside the first casing 38 and then inside the second casing 55 via a through orifice in the annular base 58. It is also possible to have the second end 62 of the first casing 38 sleeved around the cylindrical skirt 60, or even attached to the cylindrical skirt 60 by attachment means.

Alternatively, not shown, the first casing 38 and the second casing 55 can be combined to form a single casing. To carry out this, it is possible to extend the cylindrical skirt 60 until fixing means for attaching this skirt to the lateral wall 40 of the accessory gearbox 30, so that said skirt 60 forms a protective casing for the transfer shaft 34. The single casing thus formed between the transmission housing 50 and the accessory gearbox 30 may optionally be provided with sufficient reinforcement, for example by means of an increased wall thickness and/or reinforcing ribs in the longitudinal direction, in order to obtain a structural casing which participates in the suspension of the accessory gearbox 30 in the turbomachine. The transmission housing 50 is attached, for example, to a downstream flask of an intermediate casing of the turbomachine. The accessory gearbox 30 is then cantilevered in relation to the flask of the intermediate casing by said structural casing which surrounds the transfer shaft 34.

Figure 3:
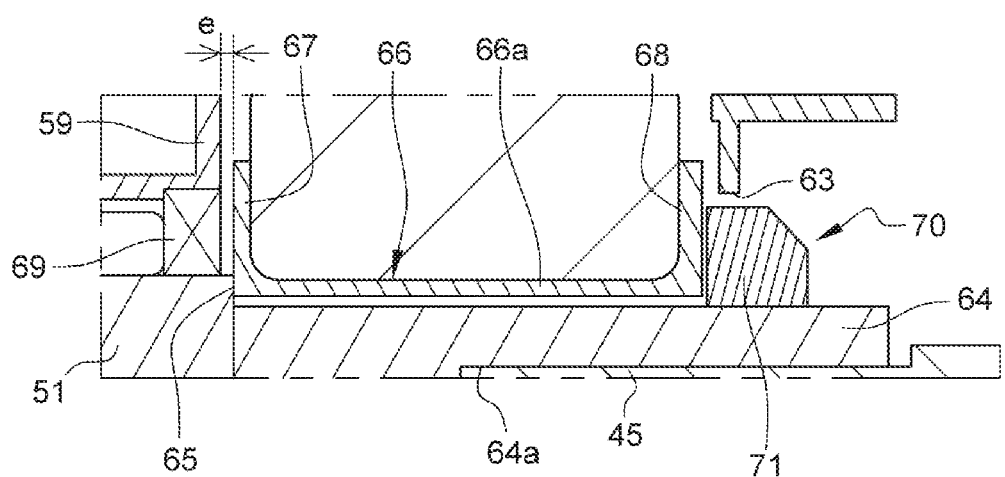
FIG. 3 is a detail view of a rotor of the electric machine connected in rotation to a transfer shaft of an accessory gearbox according to the invention.

In greater detail in FIG. 3, the annular base 58 is provided with a through orifice 63 which passes through it on either side along the axis A. The through orifice 63 is arranged radially inside the cylindrical skirt 60. The output shaft 41, and in particular its second segment 64, passes through this through orifice.

The first casing 38, the second casing 55 and the transmission housing 50 as well as the rigid envelope 33 of the accessory gearbox 30 are stationary.

With reference to FIGS. 2 and 3, a tubular bushing 66 is mounted centred on the axis A around the output shaft 41. The rotor 54*a* of the electric machine 54, which comprises permanent magnets for example, is mounted on the bushing 66 in close contact with it so that it can rotate securely with it. In other words, the rotor 54*a* is mounted radially around the output shaft 41. Similarly, the rotor surrounds at least one portion of the second end 45 of the transfer shaft which is received in the hollow portion 64*a* of the output shaft 41. The bushing 66 comprises a tubular body 66*a* with a first soleplate 67 at a first end and a second soleplate 68 at a second end. The first and second soleplates 67, 68 extend radially outwards with respect to the tubular body. The bushing 66 is mounted on the output shaft 41 and in particular on the second segment 64 of the output shaft 41.

The bushing 66 is held in abutment against the shoulder 65, once the mounting has been tightened by the tightening means 70 described below. An axial spacing e is provided between the bushing 66, which rotates with the output shaft 41, and the transmission housing 50, which is stationary, so as to avoid any contact and therefore any friction between the bushing and the housing. More specifically, the axial spacing e is provided between the first soleplate 67 of the bushing 66 and the annular flange 59 of the housing.

A sealing element 69 such as a seal, in particular a rotary seal, is mounted at the level of the opening in the annular wall 53 of the transmission housing through which the output shaft 41 extends. This seal 69 prevents lubricant leaking from the guide bearings to the outside of the transmission housing. Once the bushing 66 rests against the shoulder 65, a spacing can be maintained between the first soleplate 67 and the seal 69, so as to prevent the soleplate 67 from axially compressing the seal and compromising its operation. This spacing may be different from the spacing e, and in particular less than it. Alternatively, the first soleplate 67 may be provided in contact with the seal 69 to hold it axially, as shown in FIG. 2, without compressing it and/or compromising its operation.

The tightening means 70 allow to tighten the bushing 66 against the shoulder 65, thus holding the bushing axially on the output shaft 41. In particular, the tightening means 70 comprise a nut 71 centred on the axis A and which is mounted downstream (relative to the axis A) of the second soleplate 68. The radially external surface of the second segment 64 of the output shaft 41 therefore comprises an external thread intended to cooperate with an internal thread of the nut 71. The external diameter of the nut is smaller than the diameter of the through orifice.

The stator 54*b* of the electric machine 54 is mounted on a radially internal surface of the cylindrical wall 56 of the second casing, which is stationary. The stator 54*b* is fixedly mounted with respect to the transmission housing 50. The rotor 54*a* therefore rotates inside a stationary stator 54*b*. The rotor 54*a* is secured in rotation to the transfer shaft 34.

As can be seen in FIG. 1, an input wheel 72 is carried by the high-pressure shaft 14. This input wheel 72 is centred on the longitudinal axis X and carries a series of teeth on its radially external surface. The input wheel 72 is advantageously conical. If a speed reducer 24 is provided, it is arranged upstream of this input wheel 72.

The radial shaft 25 comprises a radially internal end which is connected in rotation to the high-pressure shaft 14. The radially internal end carries a second toothed pinion 73 which meshes with the input wheel to form a transfer gearbox. These toothed pinions are conical. In particular, the input wheel 72 and the second toothed pinion 73 form a second power transmission device 74 which is arranged between the high-pressure shaft and the radial shaft. When the high-pressure shaft 14 rotates along its longitudinal axis, the cooperation between the input wheel 72 and the second pinion 73 ensures that the radial shaft 25 also rotates along its substantially radial axis. In this way, the rotation of the radial shaft 25 causes the rotation of the transfer shaft 34 along its axis of rotation A.

In another embodiment of the invention, not shown, the accessory gearbox 30 and the first power transmission device 37 as well as the electric machine 54 are installed in the "core" area of the turbomachine, i.e. in an inter-duct compartment located between the primary and secondary ducts of the double-flow turbomachine.

The invention claimed is:

1. A turbomachine module for an aircraft, the module comprising:
   an accessory gearbox, a transfer shaft, and a drive shaft rotationally connected with one another by a power transmission device, the transfer shaft extending along an axis of rotation and being coupled to the accessory gearbox, the power transmission device being housed in a transmission housing; and
   an electric machine connected in rotation to the transfer shaft and arranged between the power transmission device and the accessory gearbox, the electric machine having a rotor and a stator, wherein the electric machine is interposed along the axis of rotation between the transmission housing and at least one portion of the transfer shaft, and wherein the power transmission device includes an output shaft which has a segment which extends outside an annular wall of the transmission housing and which is coupled to the transfer shaft, wherein the rotor is mounted radially around the segment of output shaft.

2. The module of claim 1, wherein the rotor is secured in rotation to the transfer shaft and the stator surrounds the rotor and is fixedly mounted with respect to the transmission housing.

3. The module of claim 2, wherein the stator is carried by a radially internal surface of a cylindrical wall attached to the transmission housing.

4. The module of claim 3, wherein:
the transfer shaft is enveloped by a first casing;
the electric machine is housed in a second casing mounted between the transmission housing and the first casing; and
the cylindrical wall forms a wall of the second casing.

5. The module of claim 1, wherein the output shaft comprises a first segment arranged in the annular wall of the transmission housing and a second segment which extends outside the annular wall, wherein the second segment has a diameter smaller than that of the first segment so as to form a shoulder at the junction of the first and second segments.

6. The module of claim 5, further comprising a bushing mounted on the second segment of the output shaft and positioned in abutment against the shoulder, wherein the rotor is mounted on the bushing.

7. The module of claim 6, further comprising a nut for tightening the bushing against the shoulder of the output shaft.

8. The module of claim 5, wherein the second segment of the output shaft comprises a hollow portion which extends axially over at least a portion of the second segment and which receives an end of the transfer shaft, and wherein splines are provided between the end of the transfer shaft and the hollow portion so that the output shaft and the transfer shaft are secured in rotation.

9. The module of claim 5, wherein the output shaft is guided in rotation in the annular wall by at least one rotational guide bearing, and wherein a sealing element is arranged at the level of an opening in the annular wall and around the first segment of the output shaft.

10. The module of claim 1, wherein the electric machine is of a motor and/or generator type.

11. The module of claim 1, wherein the transfer shaft extends outside the accessory gearbox.

12. A turbomachine for an aircraft, comprising:
a high-pressure motor shaft; and
a turbomachine module according to claim 1, wherein the power transmission device is a first power transmission device, and wherein the drive shaft is connected to the high-pressure motor shaft by a second power transmission device such that the transfer shaft and the high-pressure motor shaft are connected in rotation.

\* \* \* \* \*